Figure 1:
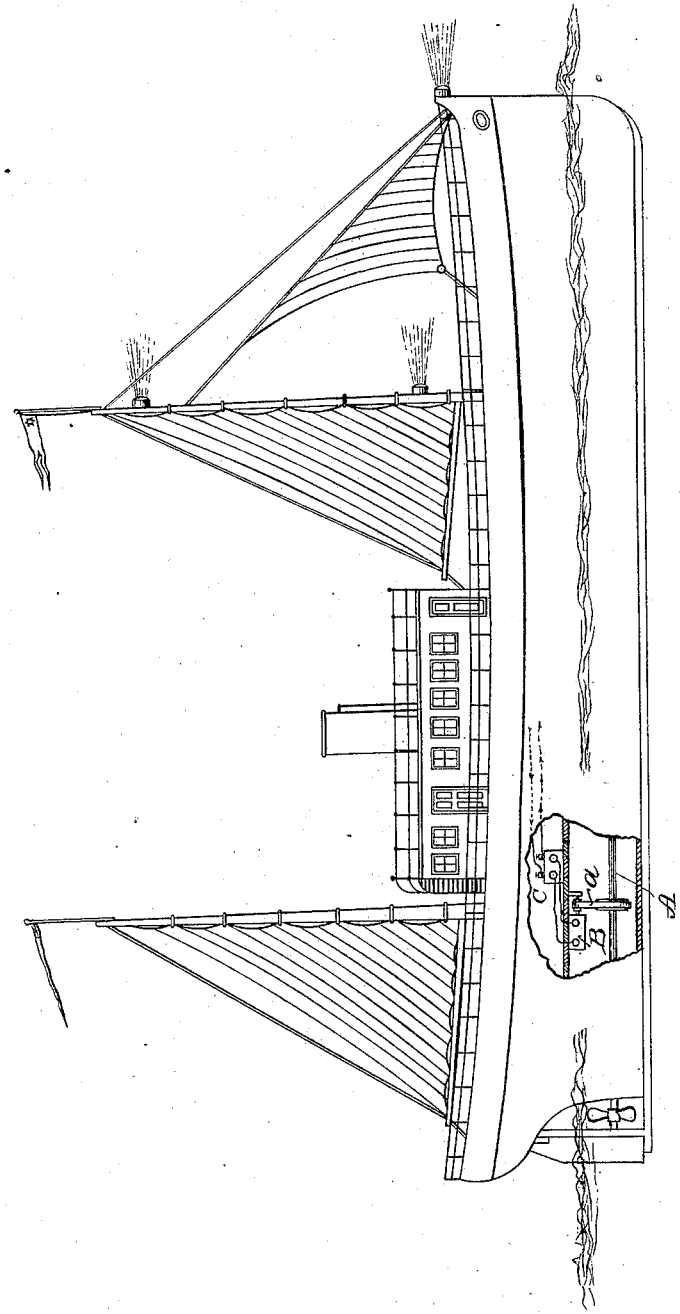

(No Model.) 2 Sheets—Sheet 1.

E. T. STARR.
ELECTRIC LIGHTING APPARATUS.

No. 257,403. Patented May 2, 1882.

WITNESSES
Wm. A. Skinkle.
Ernest Abshagen.

INVENTOR,
Eli T. Starr,
By his Attorneys
Baldwin, Hopkins & Peyton (No Model.) 2 Sheets—Sheet 2.

E. T. STARR.
ELECTRIC LIGHTING APPARATUS.

No. 257,403. Patented May 2, 1882.

WITNESSES
Wm. A. Skinkle
Ernest Abshagen

INVENTOR,
Eli T. Starr
By his Attorneys
Baldwin, Hopkins & Peyton

UNITED STATES PATENT OFFICE.

ELI T. STARR, OF PHILADELPHIA, PENNSYLVANIA.

ELECTRIC LIGHTING APPARATUS.

SPECIFICATION forming part of Letters Patent No. 257,403, dated May 2, 1882.

Application filed March 21, 1882. (No model.)

*To all whom it may concern:*

Be it known that I, ELI T. STARR, of the city and county of Philadelphia, in the State of Pennsylvania, have invented certain new and useful Improvements in Electric Lighting Apparatus for Railway-Trains and other Moving Vehicles and Vessels, of which the following is a specification.

In Letters Patent of the United States granted to me on the 13th day of December, 1881, as No. 250,764, I have shown and described a practical method of and an organization of mechanism or devices for producing lights useful upon railway-trains and for analogous purposes. In my said Letters Patent I have shown a dynamo-electric machine or mechanical generator of electricity connected by a driving-connection with a revolving axle of one of the vehicles, so as to be driven by the motion of the vehicle or train to generate electric currents by which to charge a secondary or storage battery, whereby, through suitable circuit-connections under the control of the engineer, the electric current is conducted to an electric lamp at the front of the engine to produce an electric head-light for the locomotive, and to an electric lamp at the rear of the train to produce an electric light particularly useful as a signal-light. By means of the secondary battery the lights are kept up during the stoppages of the train. An automatic circuit-breaker forms part of the circuit between the rear or signal light and the secondary battery, so that during the motion of the train said signal-light will be a flash-light, or, in other words, will be an intermittent light, consisting of a continuous series of luminous electric flashes. By means of this signal-light at the rear of the train, organized to flash while the train is in motion, the engineer of an approaching train is enabled to tell whether the train bearing the signal is standing still or is in motion, and, if in motion, at what rate of speed it is moving.

In Letters Patent of the United States granted to me on the 7th day of February, 1882, as No. 253,442, I have shown other and further improvements in the system of electric-light signaling for moving vehicles or vessels, whereby a light of one description is exhibited when the train or vehicle is moving forward and a light of another description is exhibited when the train or vehicle is moving backward. In the organization exhibited in my last-mentioned patent a third light of a distinctive character is also shown to indicate when the vehicle is at rest.

My present invention relates more particularly to the system of signaling shown in my said patent of February 7, 1882. I reserved the right, before accepting my said last-mentioned patent, to claim in another and subsequent application parts, devices, or combinations of mechanism shown in said patent, but not particularly and distinctly covered by the claims thereof. This application contemplates, therefore, some of the improvements shown but not claimed in my said patent of February 7, 1882, as well as other and further improvements, which I will first describe, and then particularly point out at the close of the specification as of my invention.

It will be understood that some of the improvements and combinations of mechanism claimed herein may be used without the others, while the details of construction may also obviously be varied within certain limits without departing from my invention.

Figure 2:
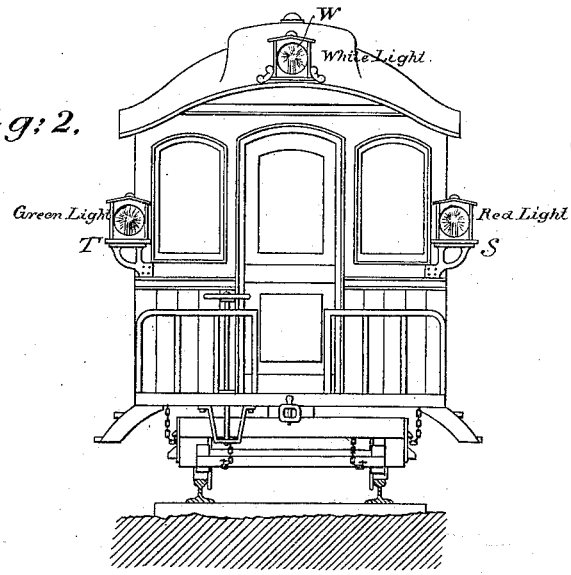
Figure 3:
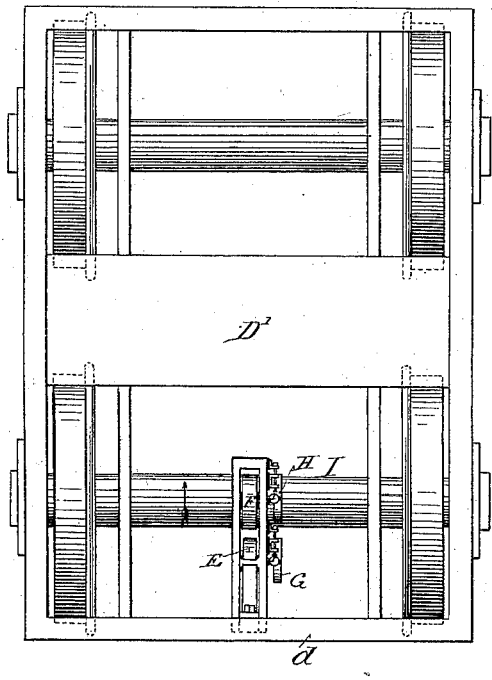
Figure 5:
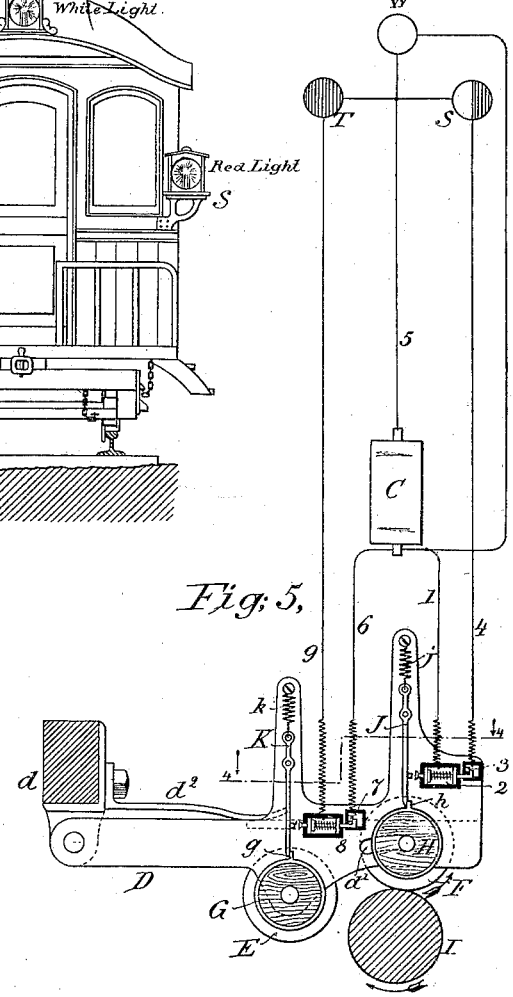
Figure 4:
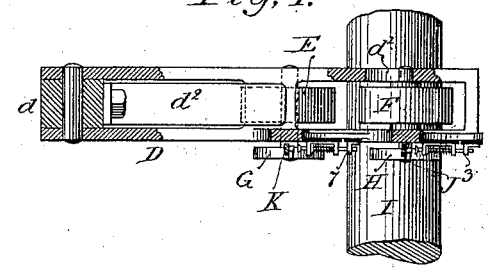

In the accompanying drawings, which represent my improvements as embodied in the best way now known to me, Figure 1 is a view in elevation of a steamship having a system of electric signal lights applied thereto, three lights being shown, a portion of the side of the vessel being broken away to show one way of running a dynamo-electric machine from the propeller-shaft of the vessel. Fig. 2 is a rear view of a railroad-car having a system of lights applied thereto, three lights being shown in the organization—to wit, a white light, a green light, and a red light. Fig. 3 is a plan or top view of one of the trucks of the tender of the locomotive of a railway-train having the circuit-breakers mounted thereon. Fig. 4 is a plan and partially-sectional view of the circuit breaking or interrupting arrangement; and Fig. 5 is a side view of the circuit-breakers carried by the truck, with an axle and other parts of the truck in section, there being also shown in this figure a theoretical diagram of the circuit-connections between the storage-battery and the electric lamps, said circuit-connections including the circuit-breaking arrangement by which flash or interrupted lights are produced at the lamps.

In Fig. 1 a revolving shaft (the propeller-shaft of the vessel) or axle A is shown as connected by a driving-belt connection, a, with a pulley on the revolving armature of a dynamo-electric machine or mechanical generator of electricity, B, so that during the motion of said shaft or axle the generator will be driven to generate electric currents by which to store a secondary battery or batteries, C. It will be understood, of course, that the generator B may be connected by a driving-connection with any one of the revolving shafts or axles of the vessel or vehicle, while the driving-connection may be so organized, if desired, that the generator may be driven at intervals only, as fully set forth in my application for Letters Patent filed January 31, 1882, and as shown and described in my aforesaid Letters Patent No. 253,442.

When my improvements are applied to vessels or vehicles which navigate the water the secondary or storage battery C may be located at any convenient point, and when applied to railway-trains the secondary battery or batteries (which may be of any approved construction) may be mounted upon the locomotive under the engineer's cab or platform, as shown and described in my aforesaid Patents Nos. 250,764 and 253,442.

The electricity generated by the dynamo-electric machine or mechanical generator of electricity B is conducted by circuit-connections—for instance, such as shown in my Letters Patent No. 250,764, or as shown in my aforesaid application of January 31, 1882—to the secondary or storage battery or batteries C, to charge said battery or batteries. From said storage-battery a portion of the electric current is conducted, when the invention is applied to railroad-trains, to an electric lamp at the front of the locomotive by circuit-connections—such, for example, as shown in my said Patent No. 250,764—in order to produce the head-light, while circuit-connections also lead from said storage-battery to a series of lamps at the rear of the train, to conduct the current that is to produce the rear, tail, or signal lights of the train. The said series of lamps at the rear of the train may be two in number, and may be shielded by glass of different colors—for instance, by green and red, respectively—so that each lamp will show a light different from the other. The object of these series of lamps is to show at night—for instance, to the engineer of an approaching train—whether the train bearing the lights is moving forward or moving backward, and this is indicated by flashing or interrupting the light of one of the signal-lamps—for instance, the red lamp—when the train is advancing, and by flashing the light of the other of said lamps—the green lamp—when the train is backing.

Fig. 5 shows a theoretical diagram of a circuit arrangement leading from the storage-battery C to the signal-lamps at the rear of the train. The circuit-connections may be run from car to car by suitable couplings in ways well understood by skillful electricians.

Circuit breakers or interrupters compose part of the circuit or circuits leading from the storage-battery to the signal-lamps, and an organization which may be employed I will now describe in detail. An arm or support, D, is jointed, for instance, to the rear cross-beam, d, of the front truck, D', of the locomotive-tender, and carries friction rollers or wheels E F, upon the rotating shafts of which rollers are keyed or fixed circuit-breaking wheels G H, having lugs or projections g h, respectively. One of said friction-rollers, E, is stationary relatively to the arm D, or, in other words, rotates in fixed bearings in said arm, and merely turns to rotate its shaft in its bearings to revolve the circuit-breaking wheel G, while the other, F, of said friction-rollers, which is in frictional engagement or contact with the axle or other rotating part I of the truck, is capable not only of rotating with its shaft when driven by said axle to turn the circuit-breaking wheel H, but may move around said axle for a limited distance, inasmuch as the shaft of the said roller F is fitted to revolve in bearings formed by curved slots d' in the arm D, as clearly shown in Figs. 4 and 5, said slots being concentric with the axis of rotation of the axle I. It will thus be seen that when the axle I is turning in a forward direction, as indicated by the arrows in Figs. 3 and 5, the wheel F only will be driven, while when said axle is turning in a backward direction said wheel F will be carried by the rotation of the axle backward and downward to the extreme limit of the curved bearing-slots, and will thereby connect said axle with the wheel E through the wheel F, a gear-connection thereby being formed between the said axle I and the friction-wheel E. A spring, $d''$, presses against the top of the bar D and forces it downward, so as to keep the wheel F in frictional contact with the axle in order to be driven when the axle is in motion in either direction. The electric current passes from the storage-battery C to the lamp S, which gives the red light at the rear of the train, by way of the wire 1, an interrupter-rod, 2, a contact nib or point, 3, and wire 4, and returns to the battery by way of wire 5. The current passes from the storage-battery to the lamp T, which gives the green light at the rear of the train, by way of the wire 6, a contact point or nib, 7, an interrupter-rod, 8, and wire 9, and returns to the battery by way of wire 5. The interrupter-rods 2 and 8 preferably consist each of a sliding rod fitted to reciprocate in an insulated box or cover, the opposite ends of the rod projecting beyond the ends of its inclosing box, as clearly shown in Fig. 5. One end of each interrupter-rod terminates in a slight enlargement or head, while the opposite end of each of said rods has a bent portion or hook, which makes contact with its respective contact nib or point, which contact-points are each also preferably inclosed in a box or cover, through which the end of the interrupter-rod slides. The interrupter-rod 2 of the red lamp S is electrically connected with the wire 1, while the contact-point 3 is electrically connected with the wire 4. The wire 6 of the green lamp T is likewise electrically connected with the contact-point 7, while the interrupter-rod 8 is also electrically connected with the wire 9. A spiral spring encircles each of the interrupter-rods within its respective box, and acts so as to normally maintain the interrupter-rod and its contact-point in electrical connection, so that the circuits from the storage-battery to the lamps S and T are normally closed so as to give out light at the said lamps.

In order to interrupt or break the circuit of the red lamp S at intervals when the car, vehicle, or vessel is moving in one direction, and thereby to indicate that the vehicle is in motion in a particular direction—in the forward direction, for example—and in order to break or interrupt at intervals the circuit of the green lamp T when the vehicle is moving in the other direction—the backward direction in this instance—and thereby, by the system of lights, to indicate at a glance the direction of motion of said vehicle, I pivot upon the bar D two levers, J K, the short arms of which are acted upon by springs $j\ k$ to normally maintain the levers in a vertical or perpendicular position. When the axle I is turning in a forward direction, due to the forward motion of the vehicle, the wheel F will be driven to rotate its circuit-breaking wheel H. The lug $h$ of said wheel H will, once for each rotation of said wheel, strike the lower end of the lever J and carry it backward out of the perpendicular. As the rotation of the wheel continues the lever will be released from the lug $h$, and will swing in the reverse direction past the perpendicular line, this action being due to gravity, aided by the spring $j$. On the return-stroke of the lever J past the perpendicular it will strike the head of the interrupter-rod 2 and drive it forward, separating its opposite end from the contact-point 3, thus breaking or interrupting the circuit of the red lamp S and momentarily extinguishing the light of said lamp. The more rapid the rotation of the axle I and operation of the circuit-breaking arrangement the more rapid will be the interruptions of the light given out at the lamp S, and consequently the rapidity of the interruptions will be an index as to the speed of the train. When the vehicle is moving backward the light from the lamp S will no longer be interrupted, while the light from the lamp T in turn will be rendered intermittent by having its circuit broken, and this will be due to the fact that by the backward rotation of the axle I the friction-wheel F will be carried backward and downward to make a gear-connection between the axle and the friction-wheel E to rotate said friction-wheel and operate its circuit-breaking wheel G, whereby the lug $g$ of said wheel G will be caused to act upon the lever K to oscillate it to interrupt the circuit of the lamp T once for each rotation of the wheel G in the same manner as the interruptions of the lamp S are caused. As in the case of the red light with respect to speed, so it is with the green light, and the rapidity of the interruptions of the circuit of the lamp T will indicate the speed at which the vehicle is moving backward. When the vehicle is at rest the signal-lights S T will both be continuous or constant lights, which will show that the vehicle is at rest or not in motion in either direction.

In addition to the signal-lights which indicate motion and the direction of motion of the vehicle or vessel, a third or white light, W, may be employed, which may also be a constant light, and may be exhibited at the same time with the other signal-lights.

Forms of circuit-breakers other than those described for use in the circuit of the signal-lamps S T will suggest themselves to skillful electricians and mechanicians for carrying out my invention.

In Fig. 1 the red lamp S is shown as mounted at the mast-head of the vessel and the green lamp T at or near the base of said mast, while the white light W is shown as located at the bow of the vessel. Any other arrangement of the lamps S T suitable for signaling may, however, be adopted. A switch arrangement will preferably form part of the circuit between the storage-battery and signal-lamps under the control of the engineer, as described in my aforesaid patents, by which the lamps may be connected in circuit with or disconnected from the battery at the proper times. A switch arrangement may also be interposed in the circuit of the generator and battery, so as to control the charging of said battery from the generator.

The advantages and benefits of the system of automatic signal-lights which I have devised in preventing disastrous collisions both on railroads and on water are obvious, and need not be elaborated herein.

The term "vehicle" used by me of course includes as well vehicles which move upon the water as those which move upon land.

I claim as my invention—

1. The combination, substantially as hereinbefore set forth, of a vehicle or train of vehicles, an axle or moving part of said vehicle or train, electric lamps carried by said vehicle or train, an electric circuit including said lamps and a source of electricity, circuit-breakers also included in said circuit, and mechanism operated by said axle or moving part, whereby one of said lamps is made to give an intermittent light when said axle is turned in one direction, while the other of said lamps is made to give an intermittent light when said axle is turned in the other direction.

2. The combination, substantially as hereinbefore set forth, of a vehicle or train of vehicles, an axle or moving part thereof, a source of electricity, electric lamps, circuit-connections including said source of electricity and said lamps, circuit-breaking mechanism, substantially as described, which normally closes the circuit-connections, so as to give out constant lights from said lamps, and mechanism operated by said axle to operate said circuit-breaking mechanism, whereby when said axle is moving in one direction the light of one of said lamps will be interrupted at intervals, while when said axle is turned in the opposite direction the light of the other of said lamps will be interrupted.

In testimony whereof I hereunto subscribe my name.

ELI T. STARR.

Witnesses:
JOHN URIAN,
WM. J. PEYTON.